(12) United States Patent
Elaty

(10) Patent No.: US 10,213,054 B2
(45) Date of Patent: Feb. 26, 2019

(54) AUTOMATED FOOD STORAGE, PREPARATION, AND DISPENSING DEVICE

(71) Applicant: Joseph Paul Elaty, Beaverton, OR (US)

(72) Inventor: Joseph Paul Elaty, Beaverton, OR (US)

(*) Notice: Subject to any disclaimer, the term of this patent is extended or adjusted under 35 U.S.C. 154(b) by 0 days.

(21) Appl. No.: 15/625,246

(22) Filed: Jun. 16, 2017

(65) Prior Publication Data
US 2017/0360259 A1    Dec. 21, 2017

Related U.S. Application Data

(60) Provisional application No. 62/351,967, filed on Jun. 19, 2016.

(51) Int. Cl.
*A47J 36/32*     (2006.01)
*A47J 44/00*     (2006.01)
*B65C 1/02*      (2006.01)
*G06Q 30/00*     (2012.01)
*G06Q 20/34*     (2012.01)
*G06Q 50/12*     (2012.01)

(52) U.S. Cl.
CPC .............. *A47J 44/00* (2013.01); *B65C 1/02* (2013.01); *G06Q 20/34* (2013.01); *G06Q 30/016* (2013.01); *G06Q 50/12* (2013.01); *A47J 36/32* (2013.01)

(58) Field of Classification Search
CPC .. A21D 8/02; A21D 13/41; A21C 9/04; A21C 11/006; A21C 5/00; A47J 36/32
USPC ......... 99/330, 325, 334, 336, 345, 348, 349, 99/352, 355, 356, 357, 403, 407, 409, 99/455, 467, 468, 470, 486
See application file for complete search history.

(56) References Cited

U.S. PATENT DOCUMENTS

2012/0185086 A1* 7/2012 Khatchadourian ...... A21D 8/02
700/233

* cited by examiner

*Primary Examiner* — Phuong T Nguyen
(74) *Attorney, Agent, or Firm* — Hayes Soloway PC

(57) ABSTRACT

An automated food storage, preparation and dispensing device includes a housing, a plurality of food compartment units, a plurality of utensil compartment units, a dispensing unit for dispensing food, a refrigeration unit, a cooking unit for cooking food material, a packaging unit for packaging the cooked food material, a food collection unit, a memory unit for information storage, a processor coupled to the memory unit, and a touch screen display. The device is configured to receive information and commands over a communication network.

14 Claims, 1 Drawing Sheet

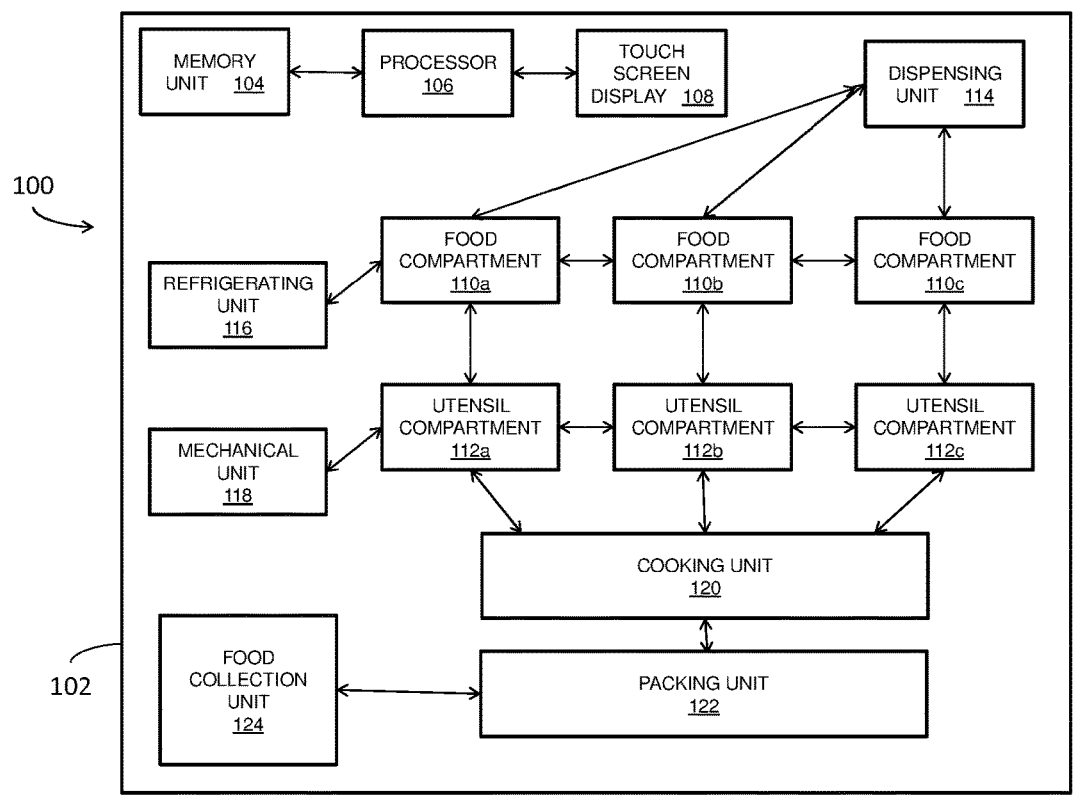

AUTOMATED FOOD STORAGE, PREPARATION, AND DISPENSING DEVICE

CROSS REFERENCE TO RELATED APPLICATION

This application claims benefit of U.S. Provisional Application Ser. No. 62/351,967 filed Jun. 19, 2016, the entire disclosure of which is incorporated herein by reference.

BACKGROUND OF THE INVENTION

1. Field of the Invention

The present invention generally relates to a food storage, preparation, and dispensing device and more particularly relates to automated food storage, preparation, and dispensing device controlled over a communication network.

2. Description of Related Art

Millions of people, around the globe, are in need of fast food, that's not "fast food", as consumers are increasingly seeking healthier options. A very wide variety of products are provided to consumers through vending machines. These range from soft drinks and pre-packaged food products, which are usually precooked and shelf ready, although not entirely healthy options. Pre-prepared food items, such as candies, cookies, chips and other snack items are generally maintained within a vending machine at room temperature and contain a large number of preservatives in order to increase their shelf life and to prevent spoilage.

Most consumers are looking for healthy, fresh, tasty food, customized to their personal and individual dietary needs, that is also readily accessible as quickly as fast food, but without all the drawbacks that general fast food options impose on consumers. These drawbacks include unhealthy, inconsistent, non-hygienic, non-customizable options. Furthermore, often fast food options are not the most convenient, as consumers often have to wait in line, have orders prepared inaccurately, and are not able to customize their own portions, which wastes both money and food, while also causing consumers to overeat. Additionally, when consumers do not see the food being prepared in front of them they are not always accurately informed of their foods nutritional value and general calorie related information.

Although there are a lot of devices described above which have been developed and are in use, providing fast food choices to consumers, there remains a continuing need for improved methods and systems for packaging, storing, and preparing food products, in a fast but customizable way, while being able to provide accurate information to the consumer as well in terms of nutritional aspects of their food.

Therefore, there remains a need for a device that allows food storage, preparation, and dispensing, which solves the above discussed drawbacks, and is additionally easy to use and customizable using consumer input.

SUMMARY OF THE INVENTION

It is an object of the present invention to provide an automated food storage, preparation, and dispensing device, which can be controlled over a communication network, such as an internet network.

According to one aspect of the invention, there is provided a device for the storage, preparation and dispensing of food materials, which comprises:
a housing;
a plurality of food compartment units contained within the housing, wherein each of the plurality of food compartment units stores a food material;
a plurality of utensil compartment units contained within the housing, wherein each of the plurality of utensil compartment units stores a utensil;
a dispensing unit adapted to dispense food materials from the plurality of food compartment units onto the utensil;
a refrigerating unit coupled with the plurality of food compartment units
a cooking unit for cooking of the food material;
a packing unit for packaging the cooked food material;
a food collection unit, wherein a user collects the cooked and packed food material;
a memory unit for information storage;
a processor coupled to the memory unit for processing instructions by a user;
a touch screen display for displaying and inputting information and/or instructions by a user; and
wherein the device is configured to receive information and commands over a communication network.

According to one embodiment of the invention, the device includes a labelling unit, so that the cooked food which has been prepared for the user can be labelled with the appropriate and accurate nutritional information. This can include information such as listing of ingredients, quantities, portion sizes, calorie content, fat content, carbohydrate content or a combination thereof.

In another aspect of the invention, the device can be commanded through software applications, which are configured to send commands to the processor through a communication network. Thus a user can send commands/instructions for food preparation to the device while not actually being present at the location of the device and interacting through a communication network instead. For example, the device can be used as a platform for recipes which have been created by nutritionists, dieticians, doctors, trainers and other users to upload, modify, select or share recipes which the device can then prepare and dispense to a user.

In one embodiment of the present invention, the processor of the device is configured to receive recipes from a user, and those recipes can be stored in the memory unit. Thusly the user can instruct the device to carry out instructions (based on these recipes) which are stored in the memory unit. This can include user specific dietary/nutritional recipes and instructions for example.

These and other objects and aspects of the present invention will become clear from the following description and accompanying drawings and claims.

BRIEF DESCRIPTION OF DRAWINGS

FIG. 1 illustrates a block diagram of an embodiment of the present invention.

DETAILED DESCRIPTION

While this technology is illustrated and described in preferred embodiments automated food storage, preparation, baking, frying, cooking and dispensing device may be produced in various shapes, sizes, colors, configuration, and computer languages. There is depicted in the drawings, and will herein be described in detail, as a preferred embodiment of the invention, with the understanding that the present disclosure is to be considered as an exemplification of the principles of the invention and the associated functional specifications for its construction are not intended to limit the invention to the illustrated embodiments. Those skilled in the art will envision numerous other possible variations which are within the scope of the technology described herein.

FIG. 1 illustrates a block diagram of the device of the present invention and describes components of the device in accordance with a preferred embodiment.

In accordance with an embodiment of the present invention, there is provided a device 100 for the storage, preparation and dispensing of food materials. The device 100 comprises a housing 102. The device 100 also comprises a plurality of food compartment units 110, such as 110a, 110b, 110c, contained within the housing 102, wherein each of the plurality of food compartment units 110 store a food material.

The device 100 further contains a plurality of utensil compartment units 112, such as 112a, 112b and 112c contained within the housing 102, wherein each of the plurality of utensil compartment units 112 stores a utensil (not shown). There is also provided a dispensing unit 114 adapted for dispensing food from each food compartment units 110 onto the utensil compartment units 112.

The device 100 further includes refrigerating unit coupled with the plurality of food compartment units 110, a cooking unit for cooking of the food material, a packing unit for packaging the cooked food material, a food collection unit, wherein a user collects the cooked and packed food material.

The device 100 further incorporates a memory unit 104 for information storage, a processor 106 coupled to the memory unit 104 for processing instructions by a user, a touch screen display 108 for displaying and inputting information and/or instructions by a user. The device 100 is configured to receive information, instructions and commands over a communication network.

Examples of the instructions and information include but are not limited to pre-stored videos about cooking of food, nutrition information related to each food material, history of each user, tracking information of each user, various dietary recipes, storing live recording of food preparation, pricing information related to each food material, payment processing, trending, different languages and other such information The users are able to add their recipes in the memory unit 104 and thus they may get their food cooked/prepared from their own recipes through the stationary device 100 or over the communication network, such as for example the internet, through a smartphone or tablet device application, or other such device.

Examples of the food materials included in the food compartment units 110, can comprise but are not limited to following:

A Base Food Material
 1. Egg Noodles
 2. Rice Noodles
 3. Udon Noodles
 4. Buck Wheat Noodles
 5. Jasmine Rice
 6. Brown Rice
 7. Vegetable Mix
Ingredients
 1. Beef
 2. Shrimps
 3. Chicken
 4. Calamari
 5. Spinach
 6. Pak Choi
 7. Baby Corn
 8. Cherry Tomato
 9. Tofu
 10. Shiitake Mushrooms
 11. Capsicum Mix
 12. Broccoli
 13. Bean Sprouts
 14. Peanuts
 15. Onions
 16. Garlic
 17. Sesame Seeds
 18. Spring Onions
 19. Cabbage
 20. Pineapple (can be pre-cut)
 21. Eggs (can be liquid dispensed)
 22. Liquid pancake mix
 23. Carrots
 24. Sweet Corn
 25. Red Pepper
 26. Yellow Pepper
 27. Green Pepper
Oils
 1. Sunflower Oil
 2. Sesame seed oil
 3. Coconut oil
 4. Vegetable oil
 5. Olive oil
Spices
 1. Ginger
 2. Garlic
 3. Coriander
 4. Salt
 5. Pepper
Sauces
 1. Soy Sauce
 2. Black Bean Sauce
 3. Oyster Sauce
 4. Teriyaki
 5. Garlic & Black Pepper
 6. Peanut Sauce
 7. Green Thai Curry
Drinks
 3. Carbonated beverages
 4. Sodas
 5. Sports drinks
 6. Water
 7. Coconut Water
 8. Vegetable/Fruit Juice Mixes The above list is merely exemplary, to show the diverse food content which can be stored and prepared for a user. Many other food items and drinks can also be envisioned to be able to be stored, prepared and dispensed by the device 100, without parting from the scope of this invention.

Examples of utensils within the utensil compartment units 112 can include but are not limited to wok boxes, drink cups, chopsticks, forks, napkins, pots, cooker, pans, etc.

The device 100 includes a refrigerating unit 116 configured with the food compartments units 110 for storing food under different temperature conditions, and a mechanical unit 118 for stirring food in the utensils (not shown). The refrigerating unit 116 is able to control the temperature of each food compartment unit 110, based on desired or required specifications. The mechanical unit 118 includes a motor and two or more robotic stirrer arms for stirring the food materials in the utensils.

The device 100 includes a cooking unit 120 for cooking food, a packaging unit 122 for packing the cooked food material, and a food collection unit 124 for allowing users to receive freshly prepared/cooked food materials. The cooking section 120 allows placement of utensils for heating the food material in the utensils. The packaging section 122 packages the food material in a safe and hygienic manner Cooking of the food material within the cooking unit 120 can include, but is not limited to, heating, baking, frying, sautéing, microwaving, mixing (where no heat/cooking is necessary) and other such cooking means known to those skilled in the art.

In another preferred embodiment of the present invention, the processor 106 is further configured to receive payments from the user. The processor 106 connects the user's payment information through a third party site for making payments by using various methods, including but not limited to card, net banking, cash, and all popular electronic and physical payment types or other known digital payment means and applications.

In another preferred of the present invention, the device 100 further comprises a plurality of food cartridges, wherein the food cartridges are capable of being refilled or replaced within the plurality of food compartment units 110, so that food material can be refilled and replaced within the food compartment units 110 as necessary, for continued operations of the device 100. The food cartridges are preferably high-quality clear BPA-Free, PVC or plastic, glass or stainless steel food cartridges to be filled with the above listed food materials and other ingredients, for example, sesame seeds, mushrooms, snap peas, onions, rice, noodles, drinks, soups, and so on.

The food cartridges are preferably clear so that a camera contained within the device can display snapshots of the condition of the food materials in each food cartridge. The food cartridges are easily swapped out quickly with fresh, clean, filled cartridges with fresher food. Older food cartridges can be taken, as necessary, to a central kitchen or facility for proper cleaning and refilling. The system is very versatile and can store other ingredients, as the market and location of the device may demand, for example fruit to make fruit salads, nuts, and salad ingredients to make salads, and so on.

In another preferred embodiment of the present invention, the processor 106 further receives commands from a software application over the communication network about processing of the instructions stored in the memory unit 104. The software application sends the command to the processor to perform instructions stored in the memory unit 104.

For example, a user can give commands to the processor 106 to prepare the food before the user reaches the location of the device 100. The user is able to select the particular device, as per their location, and then can pre-order the food prior to his/her arrival. Thus, if a user wants the food at a particular designated time, the user can order it any time from any location and is able to pick up the food from the device 100 at the selected and desired time. The software application could be programmed and downloadable either at the smartphone, tablet, computer, or accessible through a website.

In another preferred embodiment of the present invention, the device 100 further includes a cleaning unit and section for cleaning the cooking area. The cleaning may be performed by various methods, including but not limited to, high-pressure hot steam, scour, rinse, then dry with a high-pressure blower and further by application of a UV light for final bacteria removal for a completely hygienic cooking process.

In another preferred embodiment of the present invention, the device 100 further includes a labelling unit for placing labels on each freshly cooked and packaged food material. The label can contain at least one of the nutrition information, name, and order receipt. The label can further include information such as nutritional information, ingredients, quantities, portion sizes, calorie content, fat content, carbohydrate content or a combination thereof.

Thus the user is able to know about the ingredients, nutrients associated with each ingredient and other relevant details as may be required.

In another preferred embodiment of the present invention, the device 100 further includes a light sensor for sensing light levels around the device, and further for sending signals on identified light levels around the housing 102. Also included is at least one light unit, which can reflect light on receiving signals from the light sensor. When the light sensor detects darkness (or lighting conditions) around the housing 102, then a light unit (such as an LED light) turns on, so that user is able to locate the device 100 easily, and can also see the cooking/preparation process inside the device 100 through a clear glass window.

In another preferred embodiment of the present invention, the device 100 further includes a LED screen to display cooking videos relating to the cooking (preparation) of the food. The videos can be selected by the user from the instructions stored in the memory unit. Further, the device 100 includes at least one digital camera performing at least one of recording preparation or cooking of the food material, capturing photographs or recording a user's reaction, recording user's testimonials, conducting live customer service, and capturing screenshots of the food material stored in the food compartment units, and other such activities.

The present invention offers various advantages such as saving your favorite and past orders for a more personal treatment, records hundreds of dishes, and menus, themes, that can be updated or modified within minutes, further zero wait to place orders i.e. place orders through the website, or any smartphone or tablet, so it doesn't create crowds or a queue at the device location. This provides a convenient and time efficient manner of delivering healthy food to consumers at a time of their choosing, with very little effort. The system also allows for nutritionists, dieticians, doctors, trainers and other such providers to send pre-programmed meals to a users account through a smartphone application, or website, with exact ingredients, quantities, portions, and exact calorie, fat or carbohydrate contents for that particular user.

Many changes, modifications, variations and other uses and applications of the subject invention will become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A device for the storage, preparation and dispensing of food materials, comprising:
   a housing;
   a plurality of food compartment units contained within the housing, wherein each of the plurality of food compartment units stores a food material;

a plurality of utensil compartment units contained within the housing, wherein each of the plurality of utensil compartment units stores a utensil;

a dispensing unit adapted to dispense food materials from the plurality of food compartment units; onto the utensil;

a refrigerating unit coupled with the plurality of food compartment units;

a cooking unit for cooking of the food material;

a packaging unit for packaging the cooked food material;

a food collection unit, wherein a user collects the cooked and packed food material;

a memory unit for information storage;

a processor coupled to the memory unit for processing commands by a user;

a touch screen display for displaying and inputting information, commands or instructions by the user; and wherein the device is configured to receive information, commands or instructions over a communication network.

2. The device of claim 1, wherein the plurality of food compartment units further comprise a plurality of food cartridges, wherein said plurality of food cartridges are capable of being refilled or replaced within the plurality of food compartment units.

3. The device of claim 1, further comprising a mechanical unit comprising a stirring element, for mixing food material placed within the utensils.

4. The device of claim 1, further comprising a labelling unit, which is configured to place labels on the packaging of the cooked food material.

5. The device of claim 4, wherein the labels include information selected from a group consisting of ingredients, quantities, portion sizes, calorie content, fat content, carbohydrate content or a combination thereof.

6. The device of claim 1, wherein the processor is further configured to receive payment from the user.

7. The device of claim 1, wherein the processor is further configured to receive commands from a software application over the communication network.

8. The device of claim 7, wherein the commands received from the software application over the communication network comprise commands for processing the instructions stored in the memory unit.

9. The device of claim 1 wherein the processor is configured to receive recipes from the user, wherein the recipes are stored in the memory unit.

10. The device of claim 1 further comprising an LED screen to display cooking videos relating to cooking of the food material, wherein said videos are selected by the user from the instructions stored in the memory unit.

11. The device of claim 1 further comprising at least one camera for performing at least one of recording preparation or cooking of the food material, capturing photographs or recording a user's reaction, recording user's testimonials, conducting live customer service, and capturing screenshots of the food material stored in the food compartment units.

12. The device of claim 1 further comprising at least one light sensor for sensing light around the housing and at least one light unit for lighting the device inside and outside the housing, wherein the at least one light unit receives signals from the at least one light sensor.

13. The device of claim 1 further comprising a cleaning unit for cleaning the cooking unit.

14. The device of claim 1, wherein the communication network is an internet network.

* * * * *